July 1, 1969  A. MARZOCCHI  3,453,652
TREATED GLASS FIBER BUNDLES AND COMBINATIONS THEREOF
WITH ELASTOMERIC MATERIAL
Filed Nov. 1, 1962
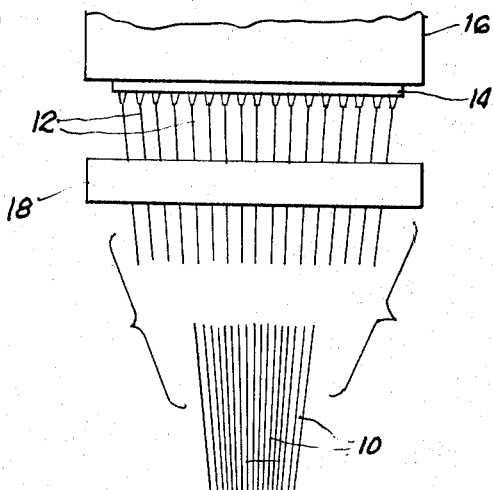
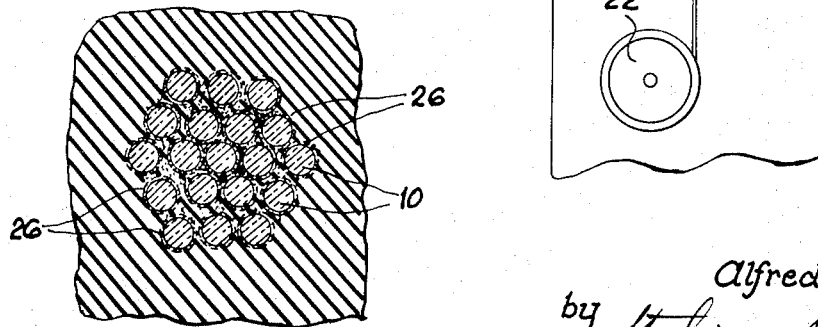
INVENTOR
Alfred Marzocchi
by Staelin & Overman
Attys 3,453,652
TREATED GLASS FIBER BUNDLES AND COMBINATIONS THEREOF WITH ELASTOMERIC MATERIAL
Alfred Marzocchi, Cumberland, R.I., assignor to Owens-Corning Fiberglas Corporation, a corporation of Delaware
Filed Nov. 1, 1962, Ser. No. 234,750
Int. Cl. D02g 3/36
U.S. Cl. 57—153                                 3 Claims This invention relates to systems formed of glass fibers and elastomeric materials and more particularly to the treatment of glass fibers whereby a stronger and more permanent interrelationship is established between the treated glass fibers and the elastomeric materials with which the glass fibers are combined in the manufacture of elastomeric plastics, laminates and coated fabrics.

As is well recognized, glass fibers are characterized as elements having exceptionally high strength, a high degree of inertness, good thermal stability, low thermal conductivity, and good dielectric properties amongst a number of other desirable physical and mechanical properties. Considerable effort has been expended in research and development in the attempt to make maximum utilization of these desirable characteristics of glass fibers in elastomeric systems fabricated into molded and laminated products, coated fabrics and the like.

It has been found that maximum utilization of glass fibers cannot be achieved in the combination with such elastomeric materials unless a strong interbonded or interconnected relationship is established between the glass fibers and the elastomeric materials with which the glass fibers are combined in the manufacture of such glass fiber reinforced elastomeric products.

The development of a strong and permanent bonding relationship between the surfaces of the glass fibers and such elastomeric materials has been faced by a number of problems existing only with glass fibers as distinguished from other natural or synthetic resinous fibers.

Since glass fibers are formed by the rapid attenuation of molten streams of glass, the glass fibers exist in the form of solid rod-like members having perfectly smooth surfaces. As a result, the elastomeric materials are incapable of penetration into the fibers to achieve anchorage and they are also unable to establish a strong grip with the perfectly smooth surfaces of the glass fibers. Thus the type of physical forces available to establish an interbonded relationship with natural fibers such as cotton, wool, silk, hemp and the like are not available for anchorage onto glass fibers and the same applies with reference to the comparison of glass fibers and synthetic organic resinous fibers onto which a strong bonding relationship can be established by the systems of solvents or heat.

In the absence of the ability to harness physical and mechanical forces for establishing a desirable interbonded relationship, the searches have been carried into the fields of ionic and chemical forces for effecting the desired bonding relationship between glass fibers and such elastomeric materials. Resort to chemical or ionic forces is confronted by the fact that the perfectly smooth surfaces of the glass fibers appear to be dominated by groupings which are hydrophilic in character to the end that the glass fiber surfaces are preferentially receptive to water by comparison with the elastomeric materials. As a result, even when a bonding relationship is established with the glass fiber surfaces, such bonding relationship is materially reduced in the presence of moisture or high humidity.

It is an object of this invention to provide a new and improved concept for effecting a desirable strong interbonded relationship or interconnected relationship between glass fibers and elastomeric materials whereby fuller utilization can be made of the desirable properties of the glass fibers in the glass fiber-elastomeric system.

This and other objects and advantages of this invention will hereinafter appear and for purposes of illustration, but not of limitation, an embodiment of the invention is shown in the accompanying drawing in which:

FIG. 1 is a schematic diagram of the fiber forming system and treatment;

FIG. 2 is a schematic sectional view of the treated glass fibers prepared in accordance with the practice of this invention; and FIG. 3 is a schematic sectional view showing the relationship of the treated glass fibers in the cured elastomeric system.

As used herein, the term "glass fibers" is intended to include continuous glass fibers which are formed by the rapid attenuation of molten streams of glass issuing from the bottom side of a glass melting furnace by winding the formed fibers onto a rapidly rotating drum or the like. It is also intended to include staple glass fibers which are formed by the rapid attenuation of molten streams of glass issuing from the bottom side of a glass melting furnace by the use of angular streams of high pressure air, steam or other gas angled downwardly onto the molten streams of glass. It is intended to include bundles formed of such continuous or staple glass fibers and yarns, cords and fabrics formed thereof.

As used herein, the term "elastomeric material" is intended to include natural rubber and chlorinated rubber, and synthetic rubbers such as neoprene, isoprene, butadiene polymers and copolymers with styrene, acrylonitrile and polyurethanes.

The concept of this invention is based upon a theory that the desired fuller utilization of the strength and other desirable properties of the glass fibers can be achieved when the glass fibers are incorporated for combination with the elastomeric material in the form of bundles of a plurality of glass fibers, such as in the form of strands, yarns or fabrics formed thereof, and when the elastomeric material is caused to penetrate sufficiently deeply into the bundle in a manner more or less to interlock the plurality of the glass fibers making up the bundles with the elastomeric material thereby to achieve the effect of intertying the glass fibers and the elastomeric component for effecting a strong bonding relationship therebetween.

In accordance with the practice of this invention, the described theoretical conditions are achieved by providing the glass fibers in the bundle, strand, yarn or fabric with a coating containing an organic compound having for its primary requirement the ability to combine with the elastomeric material in a manner to reduce the elastomeric material with which the glass fibers are associated to a more flowable state whereby the portion of the elastomeric material coming into pressure contact with the bundle of coated glass fibers is reduced in viscosity and thus capable of a high state of flow for better and more complete penetration into the bundle of glass fibers. A compound suitable for the purpose described is one in which the uncured elastomeric material is soluble and one which is capable of plasticizing the adjacent portions of the uncured elastomeric material to increase the flow characteristics thereof when brought into contact with the bundle of glass fibers under heat and pressure.

Another characteristic that is desirable though not essential for the practice of this invention resides in the use of a compound which not only operates to increase the flow of the uncured elastomer but is also capable in itself of cure to a polymerized state whereby the compound is capable of functioning as a protective agent for the glass fibers in the interior portions of the bundle which might not be penetrated by the elastomeric material and which therefore can also be applied to the glass fibers in forming to coat the individual glass fibers making up the bundle.

Another characteristic desired to be incorporated into the compound for maximizing the utilization of the desirable properties of the glass fibers in the elastomeric system resides in the ability of the compound not only to increase the flow of the elastomeric material in contact therewith but which is also capable of entering into the reaction for cure or vulcanization of the elastomeric material thereby to tie in the compound with the cured elastomeric material to provide an integrated system.

I have succeeded in obtaining the combination of the aforementioned concepts by providing the glass fibers in fiber, strand, yarn, bundle or fabric form with a coating containing, as an essential ingredient, a polyfunctional compound represented by divinylbenzene, diallylbenzene, ethylene dimethacrylate, and the like diolefinic compound.

The described polyfunctional compounds are capable of solution of the rubber or to soften or plasticize that portion of the rubber brought into contact therewith under heat and pressure whereby such portions of the elastomeric material immediately adjacent the glass fiber surfaces are reduced to a state of high flow by comparison with the remainder to the end that the elastomeric material in contact with the glass fibers is able to penetrate more deeply into the bundle of glass fibers.

The described polyfunctional compounds are also capable of polymerization whereby such portions of the polyfunctional material as are not combined or diluted by the elastomeric material in the glass fiber bundle are capable of advancement to a polymeric state which cushions the interior fibers and operates therefore to protect the fibers against destruction by mutual abrasion. Further, the polymerized polyfunctional compound in the portion of the fiber bundle which is not reached by the more flowable elastomeric component becomes tied into the elastomeric component at least through the remainder of the polyfunctional compounds in which the rubber has been dissolved to provide a gradual gradient through the glass fiber bundle ranging from a pure polyfunctional polymer at the interior of the bundle through a combination of polyfunctional polymer and cured rubber through the outer portions of the bundle to purely cured rubber beyond the glass fiber bundle with the various gradients blending into a substantially isometric system.

The polyfunctional compounds employed in the practice of this invention as a coating on the glass fibers are also capable of entering into the reaction for vulcanization or cure of the elastomeric material thereby fully to cure the elastomer alone or in combination with the polyfunctional compound in association with the glass fibers.

The polyfunctional compound, such as the difunctional compounds described, can be applied to the glass fibers in forming to provide a full coating on each of the glass fiber filaments prior to the gathering of the filaments together into the strand or bundle. When the polyfunctional compound is applied alone onto the bare glass fibers in forming, it is desirable partially to polymerize the polyfunctional compound to a low polymeric stage wherein the partially polymerized polyfunctional compound remains capable of fluid flow for application to coat the individual glass fibers, yet provides the characteristics as a film forming material to protect the glass fibers against destruction, as by mutual abrasion, during subsequent processing of the coated glass fibers into strands, yarns, or fabric. The partially polyfunctional compound thus applied to the glass fibers is still capable of operation to dissolve or plasticize the elastomeric material to increase the flow of the portion of the elastomer brought into contact therewith and it also remains effective to assist in the cure or vulcanization of the elastomeric material concurrently with its own cure to produce a fully integrated system.

For application as the sole component of the composition making up the coating on the glass fibers, it is desirable to dilute the partially cured di- or polyfunctional compound with a volatilizable solvent such as trichloroethylene or other chlorinated solvent in an amount to provide a concentration of difunctional or polyfunctional compound within the range of 10 to 50 percent by weight and preferably 10 to 30 percent by weight of the treating composition. The partially polymerized polyfunctional compound can be prepared by polymerization of the monomer at about ambient temperature with a peroxide or amine catalyst. Advancement of the polyfunctional compound from a monomeric or partially cured stage to the fully cured or polymerized state can be achieved at temperatures of 300° to 400° F.

When applied to the glass fibers in forming, the polyfunctional compound can also be embodied as a component in a conventional glass fiber size composition in an amount within the range of 5 to 25 percent by weight of the size composition. When incorporated with such other ingredients which provide the desired film forming component and lubricant, the polyfunctional compound can be incorporated as the monomer or as a partially polymerized material.

The following will represent the practice of this invention in processing the glass fibers in conjunction with glass fiber forming.

EXAMPLE 1

*Treating composition.*—Divinylbenzene, partially polymerized at ambient temperature, is dissolved in trichloroethylene in an amount to correspond to 25 percent by weight of the composition.

*Procedure.*—Continuous glass fibers 10 are formed by the rapid attenuation of molten streams 12 of glass issuing from openings in the bottom side of a bushing 14 of a glass melting furnace 16. The formed fibers are brought together by a collector 24 to form the plurality of fibers into a continuous strand 20 which is wound around a rapidly rotating drum 22 which operates thereby to impart the pulling force by which the molten streams of glass are drawn into the fibers. Before the fibers are gathered together into the strand, the individual fibers are contacted by a wiper pad 18 wet by the constant feed of the treating composition of Example 1 to coat each of the filaments with the treating composition prior to their being gathered together in the bundle.

Thus in the formed fiber bundle, each of the fibers are provided with a coating 26 of the partially polymerized divinylbenzene. In the partially polymerized state, the divinylbenzene cushions and protects each of the filaments of the glass fibers making up the strand while imparting a desired degree of lubricity and bonding for holding the fibers together in the strand while still permitting sufficient relative movement between the protected fibers to enable processing of the fibers into yarns, cords, fabrics, and the like.

Thus in the strand, the system has the construction illustrated in FIG. 2 wherein the fibers in the innermost regions of the bundle are provided with a coating of the difunctional compound to give the effect of a bundle of glass fibers which has been completely and effectively impregnated with the polyfunctional material.

The following will illustrate other compositions which may be used in the treatment of the glass fibers in forming.

EXAMPLE 2

| | Percent by weight |
|---|---|
| Ethylene dimethacrylate | 40 |
| Dichloroethylene | 60 |

EXAMPLE 3

| | Percent by weight |
|---|---|
| Partially dextrinized starch | 8.0 |
| Hydrogenated vegetable oil | 1.8 |
| Cationic wetting agent | 0.4 |
| Diallylbenzene | 3.0 |
| Remainder water. | |

The size compositions of Examples 2 and 3 can be applied to the glass fibers in forming in the same manner as that described for the composition of Example 1.

Instead of treating the glass fibers in forming to provide the fibers with a coating of the polyfunctional compound in a monomeric or partially polymerized state, application of the polyfunctional compound can be made after the fibers have been wound into the strand, yarn, bundle or fabric. Where such application is made subsequent to the processing of the fibers into the strand, yarn or fabric, it is desirable though not essential, to impregnate the glass fiber system after the size originally applied has been removed, as by washing or by heat cleaning by heating the fibers or fabric to a temperature in the range of 900° to 1150° F. in an oxidizing atmosphere to burn the size from the glass fiber surfaces.

Where the polyfunctional compound is applied by impregnation of the fiber bundle after the fibers have been processed into strands, yarns or fabrics, the polyfunctional compound is preferably applied in the form of a monomer since the protection of the glass fibers in forming is no longer a concern. As the monomer, the polyfunctional compound is capable of greater flow for substantially complete impregnation of the fiber bundle with a minimum amount of dilution thereby to increase the amount of polyfunctional compound capable of being introduced. Instead of impregnating the fiber bundle with the monomer of the polyfunctional compound, the impregnating composition can be formulated of the partially polymerized polyfunctional compound dissolved in a suitable solvent, as in Examples 1 and 2, but it is preferred to dissolve the partially polymerized compound in its own monomer thereby to provide what can be referred to as a solventless impregnating composition wherein the entire component can be converted to the cured polymer.

EXAMPLE 4

In the practice of the phase of the invention wherein the glass fibers are treated while in the form of a strand, yarn or fabric, the fabric of glass fibers is advanced through a furnace at a temperature of 1000° C. in an oxidizing atmosphere to burn off the size originally applied and to weave-set the glass fibers. The heat treated fabric is then advanced through a bath of a 50 percent solution of monomeric divinylbenzene in trichloroethylene and the fabric is then dried.

EXAMPLE 5

The process of Example 4 is repeated, only instead of moving the heat treated glass fiber fabric through a bath of divinylbenzene, the bath is composed of partially polymerized ethylene dimethacrylate dissolved in equal parts by weight of monomeric ethylene dimethacrylate.

The bundle, yarn or fabric of glass fibers processed in accordance with either of the Examples 1–5 is combined with elastomeric material in various ways to produce the glass fiber reinforced elastomeric product. By way of illustration, which also sets forth the improvement obtained by the practice of this invention, glass fibers processed in accordance with either of the Examples 1–5 are laid between strips of uncured neoprene rubber containing the necessary amount of conventional curing agents. The mass is molded under positive pressure at a temperature of 300° to 350° F. whereby the elastomeric material and the polyfunctional material in the coating are advanced to the cured stage. The uncured elastomeric material adjacent to the strands of coated glass fibers is dissolved by the polyfunctional compound present in the glass fiber coating to increase the flowability of the adjacent portions of the elastomeric material whereby the elastomeric material is capable of fuller penetration into the glass fiber bundle such that the glass fibers making up the bundle achieve a much greater area of surface contact with the elastomeric material and become entwined or interconnected therewith to effect an improved interconnected relationship which militates against relative movements between the elastomeric component and the glass fiber component thereby to achieve the effect of a strong interbonded relationship between the glass fibers and the elastomeric material. In such portions of the glass fiber bundle incapable of being reached by the elastomeric material during cure under heat and pressure, the polyfunctional compound self-cures to a polymeric material which operates to interbond with the glass fibers to cushion the glass fibers and also to interbond with the elastomeric material thereby to tie in the interior glass fibers as well as the exterior glass fibers in the bundle with the cured elastomer.

Though not equivalent to the polyfunctional compounds heretofore described, other polyfunctional compounds capable of use in accordance with the concepts of this invention include thioazoles having the general formula:

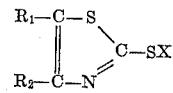

hydrazine derivatives such as phenol hydrazine and the zinc chloride salt of phenol hydrazine; mercaptans, such as the aromatic mercaptans like thiosalicylic acid, thioglycollic acid, ethyl thioglycollate, ethyl thiosalicylate, aniline thioglycollate, dithioglycollic acid, thiolbenzthiazole and dibenzthiazyl disulphide; condensation products of formaldehyde and piperidine or morphalene and hydrogen sulphide, such as N morpholine methane thiol, di-N-morpholine methyl sulphide; chloro thiophenols and thioanthranols, and dibenzamido diphenyl disulphide.

The foregoing compounds may be employed for the divinylbenzene in Examples 1 and 5 or the ethylene dimethacrylate in Example 2 or the diallylbenzene of Example 3 or the monomeric divinylbenzene of Example 4, and in equivalent amounts. Of the foregoing compounds, the thioazoles have been found to be particularly effective with natural rubbers and the hydrazine compounds have found best use with elastomers of the type butadiene-styrene copolymers.

It will be understood that the theoretical concepts described may be achieved by the selection of other polyfunctional compounds preferably of the type having more than one olefinic group capable of polymerization.

I claim:

1. A bundle of glass fibers in strand, yarn or fabric form and a coating on the surfaces of the glass fibers in the bundle to aid in the penetration of the elastomeric material combined with the glass fibers in the manufacture of cured elastomeric-glass fiber products in which the coating contains an organic polyfunctional compound having more than one functional olefinic group which is compatible with the elastomeric material in an uncured stage to reduce the viscosity of the elastomeric material coming into contact with the glass fibers of the bundle during combination to enhance the penetration of the elastomeric material into the glass fiber bundle and in which the elastomeric material is a rubber selected from the group consisting of natural and synthetic rubbers.

2. A bundle of glass fibers in the form of strands, yarns or fabrics having a coating on the surfaces of the glass fibers in the bundle to aid in the penetration of elastomeric material combined with the glass fibers in the manufacture of cured elastomeric-glass fiber structures in which the coating contains an organic polyfunctional polymerizable compound in an intermediate stage of polymeric growth which is compatible with the elastomeric material while in an uncured stage for increasing the flow characteristics of the elastomer coming into contact with the bundle of glass fibers to provide for greater penetration of the elastomeric material into the glass fiber bundle and in which the partially polymerized compound functions to protect the glass fibers in the bundle against destruction by abrasion and in which the elastomeric material is a rubber selected from the group consisting of natural and synthetic rubbers.

3. A glass fiber-cured elastomeric structure in which the glass fibers are present in the form of glass fiber bundles and a coating on the glass fiber surfaces throughout the bundle containing an organic polyfunctional compound having more than one functional olefinic group in which the elastomeric material in an uncured stage is compatible to increase the flow of elastomeric material brought into contact with the glass fibers during combination whereby the elastomeric material penetrates more deeply into the bundle of glass fibers to effect a stronger interbonded relationship between the glass fiber bundle and the elastomeric material and in which the elastomeric material is a rubber selected from the group consisting of natural and synthetic rubbers.

References Cited

UNITED STATES PATENTS

| 2,892,972 | 6/1959 | Ross | 117—126 |
| 2,723,215 | 11/1955 | Biefeld et al. | 161—193 |
| 2,799,598 | 7/1957 | Biefeld et al. | 161—193 |
| 3,207,641 | 9/1965 | Small et al. | 117—72 |

FOREIGN PATENTS 937,254  9/1963  Great Britain.

ROBERT F. BURNETT, *Primary Examiner.*

W. J. VAN BALEN, *Assistant Examiner.*

U.S. Cl. X.R.

57—140; 117—126; 156—315; 161—170